US012566745B1

(12) United States Patent
Goren

(10) Patent No.: US 12,566,745 B1
(45) Date of Patent: Mar. 3, 2026

(54) SPLITTING A NODE OF A TREE DATA STRUCTURE

(71) Applicant: VAST DATA LTD., Tel Aviv (IL)

(72) Inventor: Avi Goren, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 2 days.

(21) Appl. No.: 18/740,463

(22) Filed: Jun. 11, 2024

(51) Int. Cl.
*G06F 16/22* (2019.01)
*G06F 16/23* (2019.01)

(52) U.S. Cl.
CPC ...... *G06F 16/2246* (2019.01); *G06F 16/2272* (2019.01); *G06F 16/2308* (2019.01); *G06F 16/2343* (2019.01)

(58) Field of Classification Search
CPC ............. G06F 16/2246; G06F 16/2272; G06F 16/2308; G06F 16/2336; G06F 16/2343; G06F 16/2365
See application file for complete search history.

(56) References Cited

U.S. PATENT DOCUMENTS

| 8,086,579 | B1 * | 12/2011 | Chandrasekaran | ......................... G06F 16/2343 707/703 |
| 2008/0065672 | A1 * | 3/2008 | Bamford | ............. G06F 16/2246 707/999.102 |
| 2013/0204902 | A1 * | 8/2013 | Wang | ................... G06F 16/2365 707/E17.012 |
| 2017/0212845 | A1 * | 7/2017 | Conway | .............. G06F 12/1027 |
| 2023/0107482 | A1 * | 4/2023 | Wang | .................. G06F 16/2246 707/704 |

FOREIGN PATENT DOCUMENTS

CN          115757438 A  *  3/2023

* cited by examiner

*Primary Examiner* — James E Richardson
(74) *Attorney, Agent, or Firm* — Reches Patents

(57) ABSTRACT

A method for splitting a node of a metadata tree, the method includes (i) splitting the node of the metadata tree based on a lock contention parameter that differs from a fullness of the node, to provide split nodes; and (ii) preventing a size based merge of the split nodes for a time period following a period of a defined duration that starts after the splitting.

20 Claims, 5 Drawing Sheets

300

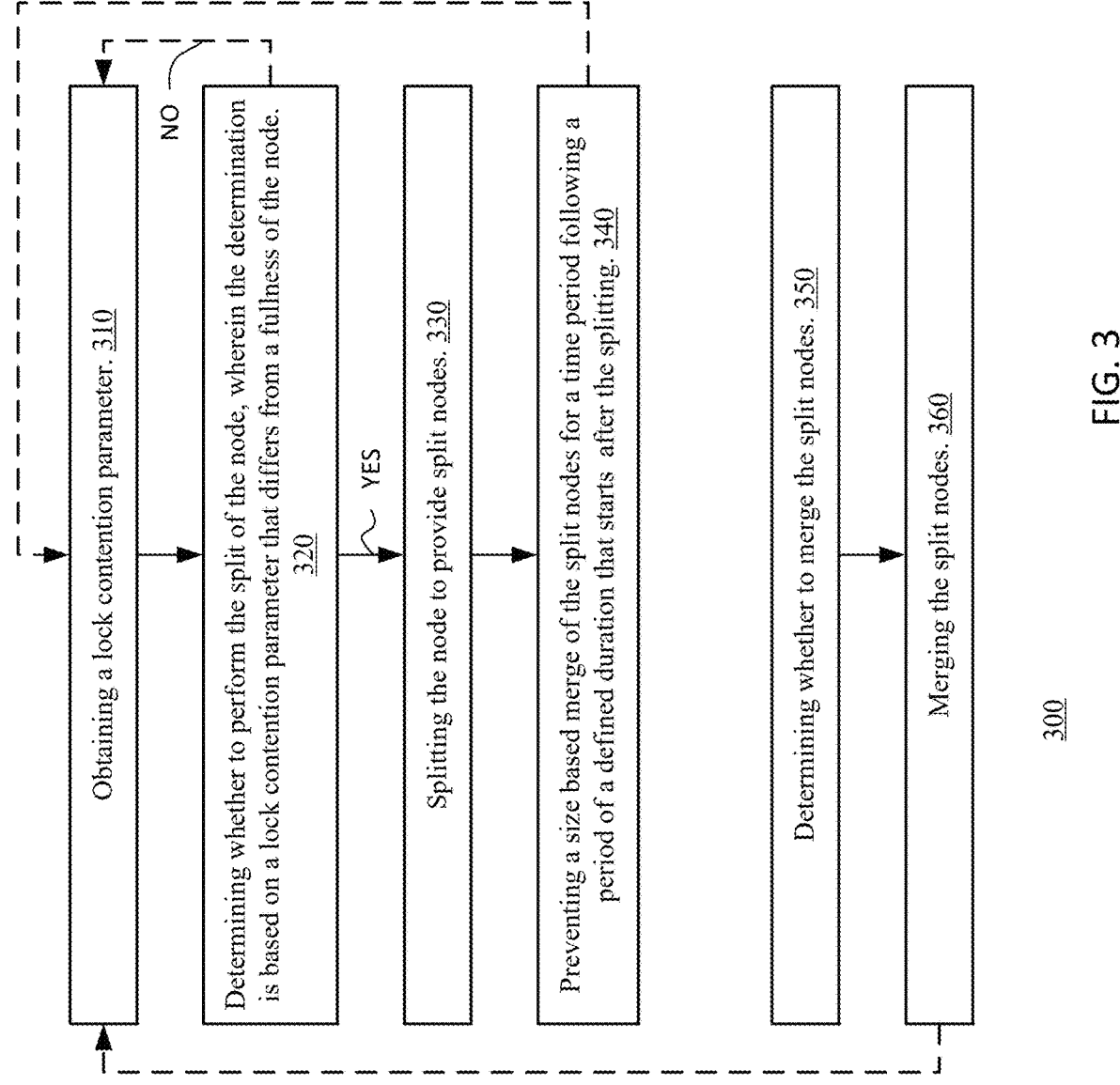

Obtaining a lock contention parameter. 310

Determining whether to perform the split of the node, wherein the determination is based on a lock contention parameter that differs from a fullness of the node. 320

NO

YES

Splitting the node to provide split nodes. 330

Preventing a size based merge of the split nodes for a time period following a period of a defined duration that starts after the splitting. 340

Determining whether to merge the split nodes. 350

Merging the split nodes. 360

SPLITTING A NODE OF A TREE DATA STRUCTURE

BACKGROUND

Tree data structures, such as a binary tree or B-tree, maintain sorted data and allow fast searches. Tree data structures embody a property of self balancing, upon insertions and deletions of entries. The self balancing supports: (1) splitting an existing node into two sibling nodes, when the existing node is overfilled. (2) merging sibling nodes that are underfilled.

Each node in a tree includes multiple ordered entries and up to a pre-defined maximum number of entries, where each entry may include a search key, data or pointer to data, and a pointer to a child node (if not a leaf node). The number of entries in each node is between d and 2d, where d is the minimum number of entries, and 2d is the upper limit. Having a node with 2d entries or more triggers a split, and having less than d entries is a trigger for merging adjacent nodes.

B-tree is commonly used in storage systems that read and write relatively large blocks of data, such as databases and file systems.

Lock contention occurs when one process attempts to acquire a lock held by another process, causing a delay, since the process needs to wait for the lock to be freed. Lock contention may slow down access to the storage by users of the storage system.

There is a need to reduce lock contention and processing load that occur when accessing a tree data structure of the storage system.

SUMMARY

There may be provided a system, a non-transitory computer readable medium, and a method for splitting a node of a tree data structure.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

FIG. 3 illustrates an example of a method.

DETAILED DESCRIPTION OF THE DRAWINGS

Figure 1:
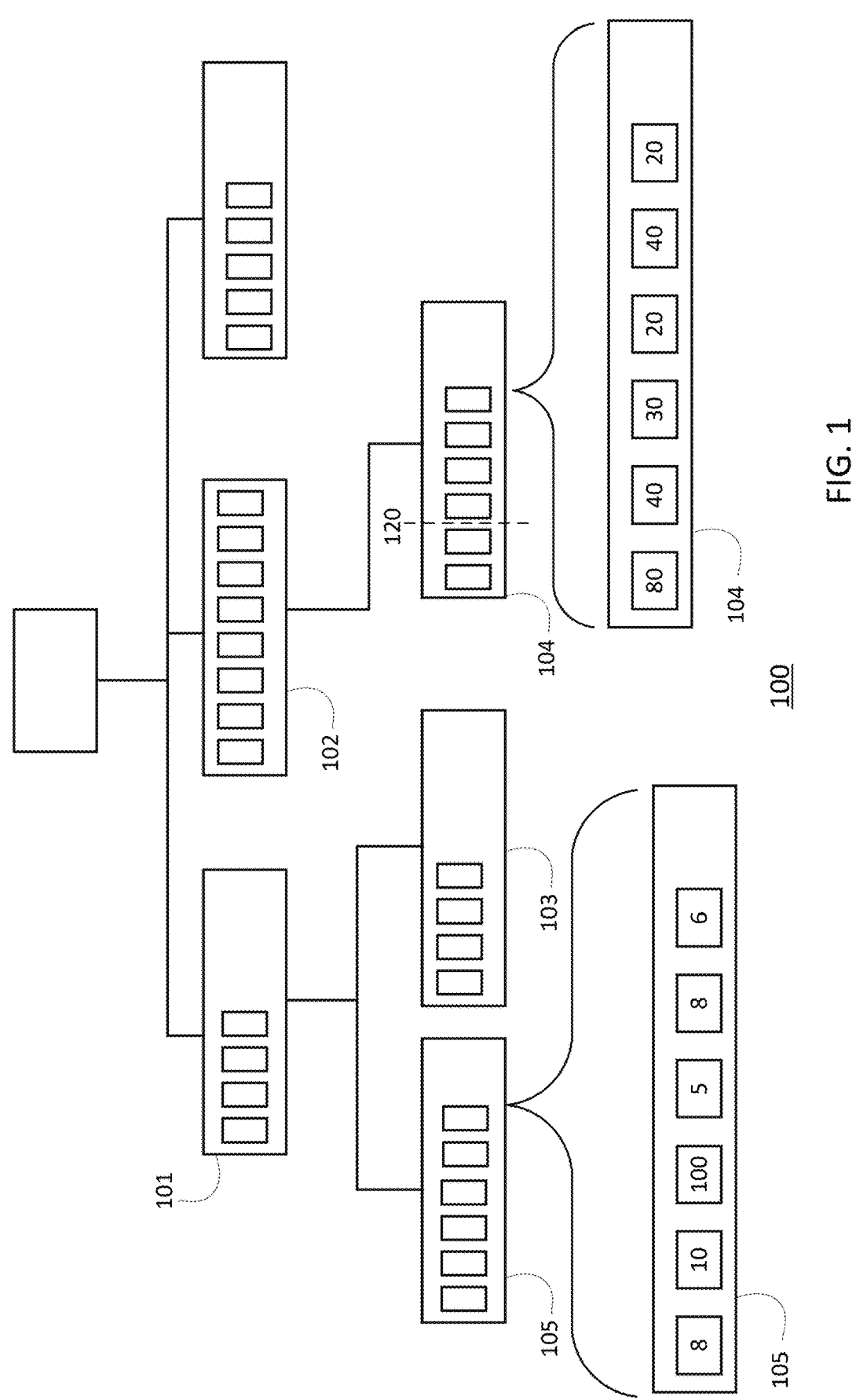
FIG. 1 is an example of a tree data structure.

A storage system employs a tree-such as but not limited to a self-balancing tree—e.g., a B-tree, for implementing metadata of filesystem entities, such as files and directories. According to an embodiment the tree is not a self-balancing tree. The metadata tree may be used for storing metadata of a directory, e.g., information of files under the directory that are ordered by names or other identifiers. The metadata tree may be further used for storing metadata of a file, e.g., information of offsets (offset, version and pointer to stored data) within the file, that are ordered by the offset values.

The metadata tree may be further used for storing metadata of a database, e.g., ordered by rows, columns, or a combination of both.

Each node may include multiple entries, each includes, e.g., offsets information, directory's files information, database information, etc.

Split and merge mechanism may be employed for the metadata tree, for splitting overfilled nodes and for merging underfilled adjacent sibling nodes. An overfilled node, which is candidate for splitting by the self-balancing mechanism, is a node that includes more than a fullness threshold number of entries, e.g. 2d or a bit less than 2d (e.g., 95% of 2d).

A lock mechanism may be used for locking an entire node, where each node is associated with a lock field. A process that needs to update, add or delete an entry of a specific node is required to lock the specific node. When there are frequent accesses towards the specific node, e.g., because the file portion that is covered by the offsets included in the specific node, is very popular-a lock contention may occur, leading to latency experienced by the users that access this file portion.

According to an embodiment, a split operation of a node of the metadata tree, can be used for solving degraded performance, caused due to existence of hot nodes (frequently accessed nodes). The hot nodes may cause lock contention, when each access to a node requires locking the hot node, which leads to degraded performance. By splitting a hot node into two sibling nodes, the number of accesses towards each of the sibling nodes is reduced and therefore the contention load is usually alleviated, compared to the contention load on the original hot node, at least when the access pattern is spread evenly between the two halves of the original hot node.

Statistics are gathered per node in order to detect frequently accessed nodes (hot nodes). If a node is detected as a hot node, then-even if the node has not crossed the fullness threshold that requires splitting, and even if the node has less entries than the minimum number of entries (d)—it may be decided to split the node into two sibling nodes, so as to reduce the contention load on the hot node.

According to an embodiment, it may be decided, by a contention balancing process, to split a hot node only when the fullness threshold has not been exceeded, because if the fullness threshold has been exceeded—the node will be split anyway by the self balancing process of the metadata tree, which may be a separate process that is executed independently from the self balancing process that performs split of overfilled nodes and a merge of underfilled nodes.

Since the merge process of the tree may independently decide to merge the two sibling nodes that resulted from a split of the hot node (as they may be underfilled), hot nodes that are split due to contention overload—are tagged with an "avoid merge" tag and a pre-defined future time, indicating to the merge process that merging should be avoided on these hot nodes, at least until the indicated future time.

The split of hot nodes may not solve the contention load problem, when the majority of accesses towards the hot node are directed towards a single entry of the hot node. In this case, splitting the hot node into two sibling nodes, where one of the sibling nodes includes the hot entry, and the other sibling nodes does not include a hot entry—the problem is not solved, as the access load is now transferred to the hot sibling node. In this case, no matter how many splits would be performed—the split would not solve the problem, but rather will generate a load caused by over splitting.

Therefore, the entries within each node are also monitored for determining the frequency of access to each entry. If it is determined that the contention load is caused by a single entry—the split is avoided. A singular hot entry in a node may be defined as an entry that exceeds the average update frequency by a certain factor, e.g., 300% of the average, or compose a majority of the total update frequency, e.g., compose 70%, 80%, 95% of the updates within the recent time window.

The split may take into account a split point which marks the point where the split of the entries into two sibling nodes should take place, in a way that balances the number of updates, rather than the number of entries in each sibling node (where the latter is usually done by the self balancing mechanism).

FIG. 1 illustrates a metadata tree 100, with different levels of fullness, e.g., different number of entries 111, in each node. Nodes 101 and 103 are half full, having four entries out of maximum eight entries—wherein half fullness is usually the minimum fullness of a node when using a traditional self balancing tree. Node 102 is completely full, and the fullness of nodes 104 and 105 is between the minimum and the maximum fullness.

Splits of nodes of tree 100 may be triggered by both: (i) the traditional split that splits nodes that reached the maximum fullness or at least most of their capacity, e.g., the maximum number of entries. This type of split may occur either when trying to add an entry to a full node, or as a background process that scans the nodes and split nodes that reached or almost reached their maximum capacity, e.g., 90%, 95% or any other major percentage of the maximum capacity; and (ii) the contention balancing split when detecting that a node is a hot node that suffers from contention delays.

Figure 2:
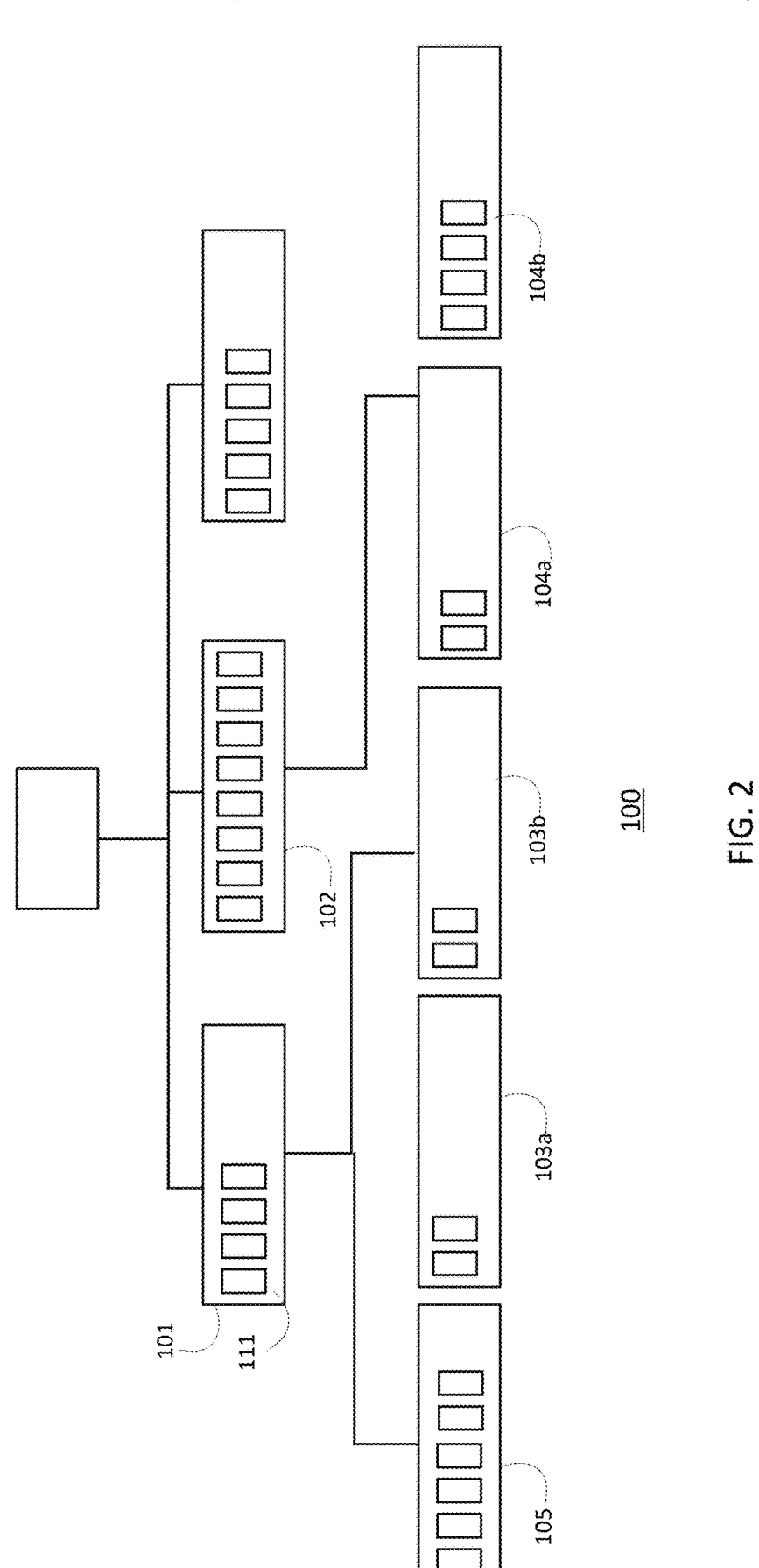
FIG. 2 is an example of a tree data structure.

FIG. 2 illustrates metadata tree 100, after the occurrence of a split that was triggered by detecting hot nodes 103 and 104. Node 103 was split into two sibling nodes 103a and 103b, even though the original node 103 had a minimum fullness level and below the maximum fullness level that usually triggers a split by a self balancing process.

Node 104 was also split, but instead of splitting in half, i.e., a first half of the entries of the original node in sibling node 104a and a second half of the entries of the original node in sibling node 104b—in this case the split point was chosen at point 120 of FIG. 1, where a third (e.g., two) of the entries populate sibling 104a and two thirds (e.g., four) of the entries populate sibling 104b. This asymmetric split may be chosen according to contention overload of the entries. For example, FIG. 1 zooms into node 104 with regard to updates that were performed on each entry within a recent time window. The sum of the first two entries is 120 (80+40), and the sum of the last four entries is 110 (30+20+40+20), therefore the splitting into sibling nodes 104a (with one third of the entries) and 104b (with two thirds of the entries)—provides the most even choice in terms of updates load.

Node 105 is an example of a hot node that is determined not to perform a split on that node because the hotness is due to a single hot entry. Referring to FIG. 1 that zooms into the update statistics of each entry: 8, 10, 100, 5, 8, 6—it can be understood that the access frequency towards the third entry is higher by more than 4 times than the average of the node, or compose more than 70% of the total access frequency.

The decision to consider a node as a candidate for splitting may depend on the access frequency as well as the contention time, i.e., the average time spent on waiting for the lock acquisition. A high access frequency may not necessarily cause latencies, but when combined with a high contention delay—latencies are probably experienced by the accessing users. On the other hand, a high contention delay may be observed even though the access frequency is low, if the access process itself is slow. In this case, a split would not solve the latency. Therefore, both the access (contention) frequency as well as the contention time are considered.

FIG. 3 illustrates an example of method 300 for splitting a node of a metadata tree. The method may be performed by a process for splitting nodes based on lock contention, that is executed separately from a process for self balancing based on fullness of nodes. Alternatively, the same self balancing process may consider splitting based on both lock contention and fullness.

According to an embodiment, method 300 includes step 310 for obtaining a lock contention parameter.

According to an embodiment, the lock contention parameter is at least one of lock contention statistics gathered for the node, an average duration of lock contention per update, an aggregated duration of lock contention experienced by update processes accessing the node, a probability of occurrence of lock contention based on at least lock frequency, statistics of accesses to different entries of the node associated with lock operations (e.g., the number of updates that requires locking, per entry), indication of whether a splitting of the node will resolve or reduce the lock contention (e.g., based on lock load across different entries of the node, based on whether lock load is experienced by both halves of the node), latency associated with the access to the node, whether there is a need to reduce the latency by reducing contention load, a cost associated with the split (caused by additional workload), available resources for managing the splitting, size constraints indicative of a size of the split nodes, profiles of accesses to the entries of the node (whether the accesses are spread across the different entries or directed to a specific entry), an estimated and/or monitored relationship between split and merge operations related to the node, a maximal number of split and merge operations per node, a maximal number of split and merge operations per node and during a defined period of time, and the like.

According to an embodiment, step 310 is followed by step 320 of determining whether to perform the split of the node, wherein the determination is based on a lock contention parameter that differs from a fullness of the node. A fullness of the node refers to the number of occupied entries.

According to an embodiment, the lock contention parameter is indicative of, or is influenced by at least one of: a duration (average or total) of a lock contention, a probability of occurrence of lock contention, statistics of accesses to different entries of the node associated with lock operations, indication of whether a splitting of the node will resolve or reduce the lock contention, latency associated with the access to the node, a cost associated with the split—including a cost of a management of split and merge operations, amount of memory resources and/or processing resources allocated to the splitting, available resources for managing the splitting, profiles of accesses to the entries of the node, an estimated and/or monitored relationship between split and merge operations related to the node, a maximal number of split and merge operations per node, a maximal number of split and merge operations per node and during a defined period of time, and the like.

According to an embodiment, a cost function is applied on one or more examples of lock contention parameter mentioned above to determine whether to split the node.

According to an embodiment, the determination of whether to split the node may be executed regardless of the fulness of the node. Thus—even when the node is not full enough, e.g., below a fullness level for performing a fullness based split—step 320 may determine to perform the split. In this case the lock contention parameter overcomes the fullness parameter.

According to an embodiment, there may be provided a tradeoff between the lock contention parameter and the fullness parameter. For example, in a case where the storage space occupied by the metadata tree exceeds a storage capacity threshold (e.g., occupied 70%, 80%, 90% of its maximum capacity)—then it may be determined not to split the node based on the lock contention parameter solely, or—to split based on the lock contention parameter and a certain fullness level, that may be lower than the fullness level that triggers a fullness based split, for example, if a fullness based split is done when the node is almost (e.g., above 90%) full, then—when there is storage space issue, and the lock contention parameter indicates a need to split, and the fullness is above a level of e.g., 50%—then the split can be performed.

According to an embodiment, step 320 includes deciding to split regardless of a fullness level of the node.

When it is determined to perform the split then step 320 is followed by step 330 of splitting the node to provide split nodes.

According to an embodiment, step 330 is followed by step 340 of preventing a size based merge of the split nodes for a period of a defined duration that starts after the splitting. For Example—overriding a request of a merge unit to perform a merge, or masking merge requests, or not generating merge requests to the node, or informing a merge unit not to generate merge requests till the period ends and the like. Preventing may include tagging the node with a "no merge" indication and the time duration. When the merge unit that executes the merging process encounters a node that is tagged with the "no merge" indication for a time that was not lapsed—then the merge unit will skip checking the fullness of the node and skip merging of the node.

According to an embodiment the duration of the period is provided to method 300 or is determined by method 300. According to an embodiment the duration of the period is maintained unchanged during multiple iterations of method 300. According to an embodiment the duration of the period changes overtime.

According to an embodiment the duration of the period is determined based on at least one of estimated or measured node lock patterns, monitoring results indicative of split and merge operation related to the node, estimated split and merge operation related to the node, or the popularity of the node. It may be determined to change the duration of the period when a certain node undergoes multiple cycles of merges that follow splits based on lock contention parameter. The duration may be determined based on the number of cycles, e.g., proportional to the number of merge-split cycles. If the number of merge-split cycles exceeds a certain threshold—then it may be determined to mark the node with an unlimited "no merge" indication, with no time limits, where the merge process ignores such a node, without checking the time period.

According to an embodiment, nodes that are more popular than others (receive or are expected to receive more lock requests per time period) may benefit from a period of a longer duration. Therefore, the duration may be determined based on the node's statistics regarding lock contention.

According to an embodiment, the node lock patterns may be associated with certain time periods—for example—accesses that are associated with locks are more frequent during the certain time periods and are less frequent during other time periods—in this case the defined duration may be set to fall on the busier time periods and not cover the less busy time periods.

According to an embodiment there may be imposed a limit on the maximal number of merger and/or split operations per time period.

According to an embodiment, method 300 also includes step 350 of determining whether to merge the split nodes.

When it is determined to merge—then step 350 is followed by step 360 of merging the split nodes.

According to an embodiment, either one of steps 330, 340 and 320 (when determining not to perform a merge) are followed by step 310 or 320.

Figure 4:
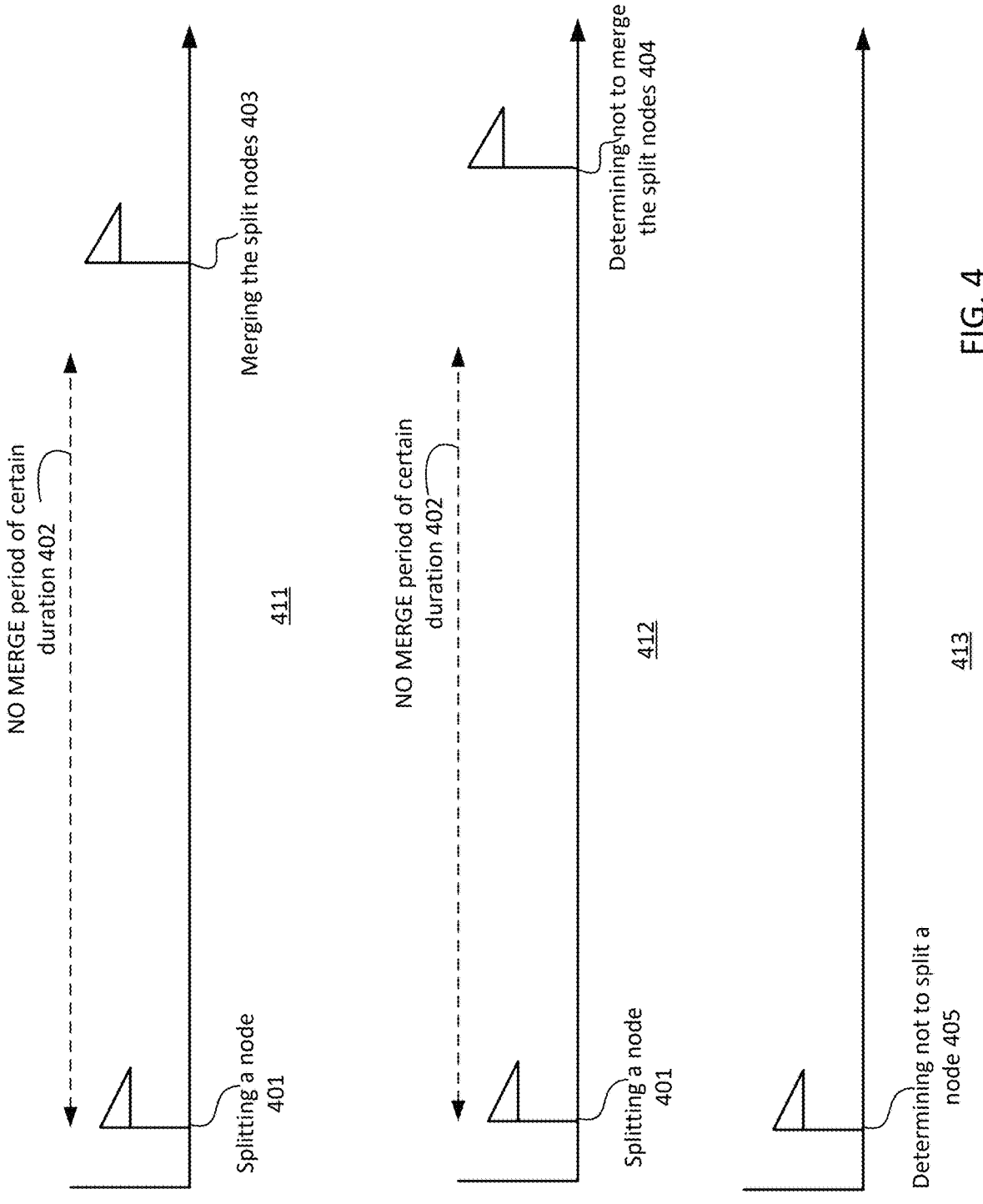
FIG. 4 illustrates a timeline of splitting and merging.

FIG. 4 illustrates time diagrams 411, 412 and 413 of examples of three scenarios.

Time diagram 411 illustrates a splitting of a node 401 followed by a NO MERGE period of certain duration 402 during which the split nodes are not merged, followed by an idle period that in turn is followed by merging the split nodes 403. During the NO MERGE period, the fullness level of the nodes may be a level that would trigger a merge if the nodes would not be tagged with the NO merge indication.

Time diagram 412 illustrates a splitting of a node 401 followed by a NO MERGE period of certain duration 402 during which the split nodes are not merged, followed by an idle period that in turn is followed by a decision not to merge the split nodes 404.

Time diagram 413 illustrates a determining not to split a node 405.

Figure 5:
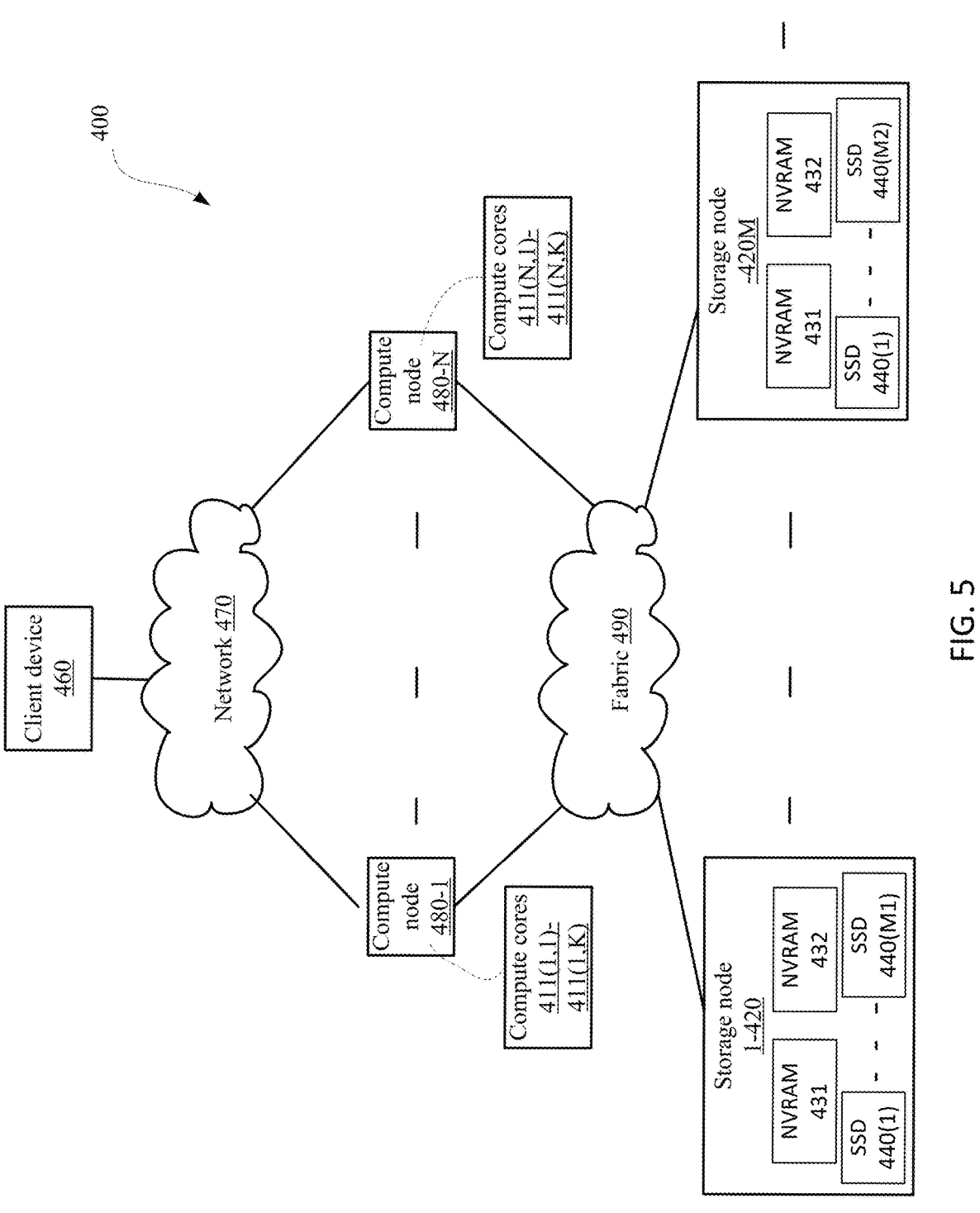
FIG. 5 illustrates a storage system.

FIG. 5 shows an example diagram of a storage system 400 for storing the metadata tree and for implementing the contention based split according to the disclosed embodiments.

The storage system 400 includes a number of N compute nodes 480-1 through 480-N. The compute nodes include (or may execute) multiple compute cores each—see for example compute cores 411(1,1)-411(1,K) and compute cores 411(N,1)-411(N,K). A compute core can be a processing circuit, a part of processing circuit, and the like. The processing circuit may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

The storage system 400 also includes a number of M storage nodes 420-1 through 420-M. The compute nodes 480 and the storage nodes 420 are connected through a communication fabric 490. M may equal N or may differ from N.

Each compute node 480 interfaces with multiple client devices (that include accessing entities) such as a client device 460 (or an application installed therein) via a network 470. To this end, a compute node 480 is configured to receive requests (e.g., read or write requests) and promptly serve these requests in a persistent manner.

According to an embodiment, the compute nodes are configured to perform one or more steps of method 300 and to access the storage nodes where the metadata tree is stored, for reading and updating nodes of the tree.

The storage nodes 420 provide the storage and state in the system 400. Each storage node 420 may include a plurality of SSDs, such as SSDs 440, for example storage node 420-1 includes M1 SSDs 440(1)-340(M1). According to an embodiment, the tree data structure is stored in one or more of the NVRAM 431 and 432 or in one or more SSDs 440 of FIG. 4.

A compute nodes 480 may be configured to communicate with the storage node 420 over the communication fabric 490. It should be noted that each compute node 480 can communicate with each storage node 420 over the communication fabric 490. Each compute node is further configured to perform direct memory access, over communication fabric 490, towards storage devices of the storage nodes. There may not be a direct coupling between a compute node 480 and storage node 420.

In the embodiment, the communication fabric 490 may include an Ethernet fabric, an InfiniBand fabric, and the like. Specifically, the communication fabric 490 may enable communication protocols such as, but not limited to, remote direct memory access (RDMA) over Converged Ethernet (ROCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

Any reference to "may be" should also refer to "may not be".

In the foregoing detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

I claim:

1. A method for splitting a node of a metadata tree, the method comprising:

splitting, by a lock contention process, the node of the metadata tree based on a lock contention parameter that differs from a fullness of the node, to provide split nodes, wherein the metadata tree is managed by both the lock contention process and a self balancing process that splits and merges nodes of the metadata tree, based on a fullness parameter of the nodes: the lock contention process and the self-balancing process are executed by one or more compute nodes of a storage system; wherein the metadata tree is stored in one or more storage nodes of the storage system; and preventing, by the lock contention process and from the self balancing process, to perform a size based merge of the split nodes, regardless of a fullness level of the split nodes, during a period of a defined duration that starts after the splitting.

2. The method according to claim 1 wherein the splitting is executed regardless of a fullness level of the node.

3. The method according to claim 1, wherein the lock contention parameter is indicative of at least one of an amount of memory resources allocated to the splitting, or an amount of processing resources allocated to the splitting.

4. The method according to claim 1, wherein the lock contention parameter is related to one of (a) a duration of accessing the node and obtaining a lock, or (a) a frequency of lock operations applied on the node.

5. The method according to claim 1, wherein the node includes multiple entries, wherein the method further comprises: (i) collecting, per different entries of the multiple entries, statistics regarding frequencies of lock operations associated with accesses to the different entries; and (ii) determining a split point related to the splitting of the node based on the statistics.

6. The method according to claim 1, comprising preventing from performing the split when at least a predefined percent of lock operations are associated with access to a single entry of multiple entries of the node.

7. The method according to claim 1, wherein the lock contention parameter is indicative of whether the split will resolve lock contentions.

8. The method according to claim 1, wherein the defined duration is determined based on node lock patterns.

9. The method according to claim 1, wherein the defined duration is determined based on estimated or actual split and merge operation related to the node.

10. The method according to claim 1, wherein the preventing comprises overriding a request of a merge unit of the storage system to perform a merge or masking merge requests.

11. The method according to claim 1, wherein the defined duration is determined based on a popularity of the node.

12. A non-transitory computer readable medium for splitting a node of a metadata tree, the non-transitory computer readable medium that stores instructions that once executed by a processor causes the processor to:

splitting, by a lock contention process, the node of the metadata tree based on a lock contention parameter that differs from a fullness of the node, to provide split nodes, wherein the metadata tree is managed by both the lock contention process and a self balancing process that splits and merges nodes of the metadata tree, based on a fullness parameter of the nodes; and preventing, by the lock contention process and from the self balancing process, to perform a size based merge of the split nodes, regardless of a fullness level of the split nodes, during a period of a defined duration that starts after the splitting.

13. The non-transitory computer readable medium according to claim 12 wherein the splitting is executed regardless of a fullness level of the node.

14. The non-transitory computer readable medium according to claim 12, wherein the lock contention parameter is indicative of at least one of an amount of memory resources allocated to the splitting, or an amount of processing resources allocated to the splitting.

15. The non-transitory computer readable medium according to claim 12, wherein the lock contention parameter is related to a duration of accessing the node and obtaining a lock or to a frequency of lock operations applied on the node.

16. The non-transitory computer readable medium according to claim 12, wherein the node includes multiple entries, wherein the non-transitory computer readable medium further stores instructions for: (i) collecting, per different entries of the multiple entries, statistics regarding frequencies of lock operations associated with accesses to the different entries; and (ii) determining a split point related to the splitting of the node based on the statistics.

17. The non-transitory computer readable medium according to claim 12, that stores instructions for preventing from performing the split when at least a predefined percent of lock operations are associated with access to a single entry of the node.

18. The non-transitory computer readable medium according to claim 12, wherein the lock contention parameter is indicative of whether the split will resolve lock contentions.

19. The non-transitory computer readable medium according to claim 12, wherein the defined duration is determined based on node lock patterns or on monitoring results indicative of split and merge operation related to the node.

20. The non-transitory computer readable medium according to claim 12, wherein the preventing comprises overriding a request of a merge unit of the storage system to perform a merge or masking merge requests.

* * * * *